United States Patent
Hu et al.

(10) Patent No.: US 8,467,352 B2
(45) Date of Patent: Jun. 18, 2013

(54) METHOD AND ARRANGEMENT FOR TRANSMIT POWER CONTROL OF MULTIPLE DOWNLINK CARRIERS

(75) Inventors: Rong Hu, Sollentuna (SE); Rui Fan, Beijing (CN); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 195 days.

(21) Appl. No.: 12/988,529

(22) PCT Filed: Apr. 27, 2009

(86) PCT No.: PCT/SE2009/050439
§ 371 (c)(1),
(2), (4) Date: Oct. 19, 2010

(87) PCT Pub. No.: WO2009/134200
PCT Pub. Date: Nov. 5, 2009

(65) Prior Publication Data
US 2011/0038295 A1 Feb. 17, 2011

Related U.S. Application Data

(60) Provisional application No. 61/048,621, filed on Apr. 29, 2008.

(51) Int. Cl.
*H04B 7/216* (2006.01)
*H04B 7/212* (2006.01)
*H04B 7/70* (2006.01)

(52) U.S. Cl.
USPC ........... 370/335; 370/342; 370/337; 370/347; 455/522

(58) Field of Classification Search
USPC .................. 370/335, 342, 347, 337; 455/522
See application file for complete search history.

(56) References Cited

U.S. PATENT DOCUMENTS 6,154,659 A 11/2000 Jalali et al.
2004/0214602 A1* 10/2004 Aoyama ....................... 455/561

(Continued)

FOREIGN PATENT DOCUMENTS

JP 2005-045504 A 2/2005
JP 2007-037110 A 2/2007

(Continued)

OTHER PUBLICATIONS

International Search Report, PCT Application No. PCT/SE2009/050439, Mailed Aug. 21, 2009.

(Continued)

*Primary Examiner* — Andrew Lee
(74) *Attorney, Agent, or Firm* — Myers Bigel Sibley & Sajovec, P.A.

(57) ABSTRACT

The present invention relates to a method and an arrangement for controlling downlink power in a multi-carrier communication network system. The communication network system comprises communication network nodes (15) communicating with a plurality of user equipments (18) on uplink (17) and downlink (16) carriers over a radio interface. Downlink transmit power control commands are sent on at least one uplink control channel to support power control for a multiple of downlink carriers. Each transmit power control command is assigned a pre-determined code word known by said user equipment (18) and said communication network node (15) and/or different pre-determined slot formats, known by said user equipment (18) and said communication network node (15), are used to integrate different number of transmit power control command based on the number of used downlink and uplink carriers.

18 Claims, 4 Drawing Sheets

U.S. PATENT DOCUMENTS

| | | | |
|---|---|---|---|
| 2004/0248581 A1 | 12/2004 | Seki et al. | |
| 2005/0018656 A1* | 1/2005 | Rudolf et al. | 370/352 |
| 2005/0053036 A1* | 3/2005 | Takeda | 370/332 |
| 2006/0183438 A1* | 8/2006 | Ishii et al. | 455/101 |
| 2006/0270431 A1 | 11/2006 | Yoshi | |
| 2007/0018722 A1 | 1/2007 | Jaenecke | |
| 2007/0037593 A1* | 2/2007 | Osterling et al. | 455/502 |
| 2007/0178902 A1* | 8/2007 | Guethaus et al. | 455/442 |
| 2007/0201407 A1 | 8/2007 | Borran et al. | |
| 2009/0082056 A1* | 3/2009 | Iwanaga et al. | 455/522 |
| 2009/0116421 A1 | 5/2009 | Kawasaki | |
| 2012/0044923 A1* | 2/2012 | Dateki | 370/338 |
| 2012/0127900 A1* | 5/2012 | Song et al. | 370/310 |

FOREIGN PATENT DOCUMENTS

| | | |
|---|---|---|
| WO | WO 03/037027 A1 | 5/2003 |
| WO | WO 2005/018125 A1 | 2/2005 |
| WO | WO 2006/022876 A1 | 3/2006 |
| WO | WO 2007/144947 A1 | 12/2007 |

OTHER PUBLICATIONS

International Preliminary Report on Patentability, PCT Application No. PCT/SE2009/050439, Completed Jul. 15, 2010.

"Universal Mobile Communications System (UMTS); Physical Channels and Mapping of Transport Channels onto Physical Channels (FDD)(3GPP TS 25.211 version 7.5.0 Release 7); ETSI TS 125 211" ETSI Standards, Lis, Sophia Antipolis Cedex, France, vol. 3-RI, No. V7.5.0, Apr. 1, 2008.

Japanese Office Action and Corresponding to Japanese Patent Application No. 2011-507375; Mailing Date: Jan. 8, 2013; 9 Pages (Foreign Text Only).

English Language Summary of Japanese Office Action for Japanese Patent Application No. 2011-507375; Mailing Date: Jan. 8, 2013.

* cited by examiner

METHOD AND ARRANGEMENT FOR TRANSMIT POWER CONTROL OF MULTIPLE DOWNLINK CARRIERS

CROSS REFERENCE TO RELATED APPLICATIONS

This application is a 35 U.S.C. §371 national stage application of PCT International Application No. PCT/SE2009/050439, filed on Apr. 27, 2009, the disclosure and content of which is incorporated by reference herein in its entirety which claims the benefit of priority of U.S. Provisional Application No. 61/048,621, filed Apr. 29, 2008. The above-referenced PCT International Application was published in the English language as International Publication No. WO 2009/134200 A1 on Nov. 5, 2009. The disclosures of both of the above referenced applications are hereby incorporated herein in their entireties by reference.

TECHNICAL FIELD

The present invention relates to a multi-carrier communication network system and, in particular to an arrangement of controlling downlink power in a multi-carrier communication network system as well as a method for such control.

BACKGROUND

Operation of wideband code division multiple access/high speed packet access (WCDMA/HSPA) on multiple 5 MHz frequency blocks ("carriers") is one further step of evolving WCDMA and HSPA. This mode of operation is often referred to as Multi-Carrier WCDMA or Multi-Carrier HSPA, in the following referred to as "multi-carrier HSPA".

A multi-carrier arrangement with frequency division duplex (FDD) may be described as a set of downlink (DL) carriers linked to a set of uplink (UL) carriers. The downlink carriers may be adjacent or non-adjacent in the frequency domain, and the same holds for the uplink carriers. More general, carriers do not need to be in the same band and TDD bands could also be used as part of the multi-carrier operation.

The multi-carrier arrangements may also be such that the number of downlink carriers is different from the number of uplink carriers.

The out-of-sync detection is based on fractional dedicated physical channel (F-DPCH), which carries the uplink transmit power control (TPC) commands sent on the downlink. In a multi-carrier HSPA system, the motivation of using multiple fractional dedicated physical channels (F-DPCHs) on different DL carriers is to have reliable out-of-sync detection independently on each carrier since both interference and fading are independent. When there are several downlink carriers then out-of-sync detection based only on the anchor carrier might cause unnecessary radio link failure deteriorating user performance.

WCDMA and HSPA systems make use of mechanisms to control the downlink power, in which TPC commands are sent on the uplink to control downlink dedicated channels (e.g. F-DPCH and other R99 DPCHs) transmit power. When using multiple F-DPCHs on the downlink, there will be an issue of how to convey TPC commands on the uplink for these F-DPCHs. One simple way might be to use multiple UL dedicated physical control channels (DPCCHs) on the uplink. But the cost will be high in terms of power consumption and frequent physical channel setup and release due to that sometime the UE receives data from one carrier with one F-DPCH while sometime the UE receives data from multiple carriers.

Another drawback of using multiple DPCCHs, which are mapped on multiple channelization codes in the uplink, is the increase in the uplink peak to average power ratio. This in turn would require UE to further reduce its maximum power in order to meet the radio transmitter requirements such as adjacent channel leakage ratio (ACLR). In simple words the use of multiple DPCCHs would lead to increase in the uplink power back-off resulting in coverage loss.

SUMMARY

Accordingly, one object of embodiments of the present invention is to provide an improved method and arrangement for controlling downlink power in a multi-carrier communication network system comprising communication network nodes communicating with a plurality of user equipments on uplink and downlink carriers over a radio interface.

According to a first aspect of embodiments of the present invention this objective is achieved through a method as defined in the characterizing portion of claim 1, which specifies that downlink power is controlled by a method which performs the step of sending downlink transmit power control commands on at least one uplink control channel to support power control for a multiple of downlink carriers.

According to a second aspect of embodiments of the present invention this objective is achieved through a method as defined in the characterizing portion of claim 2, which specifies that downlink power is controlled by a method which performs the step of sending downlink transmit power control commands on at least one uplink control channel to support power control for a multiple of downlink carriers, wherein each transmit power control command is assigned a pre-determined code word known by said user equipment and said communication network node.

According to a third aspect of embodiments of the present invention this objective is achieved through a method as defined in the characterizing portion of claim 6, which specifies that downlink power is controlled by a method which performs the step of sending downlink transmit power control commands on at least one uplink control channel to support power control for a multiple of downlink carriers, wherein different pre-determined slot formats, known by said user equipment and said communication network node, are used to integrate different number of transmit power control command based on the number of used downlink and uplink carriers.

According to a fourth aspect of embodiments of the present invention this objective is achieved through a method as defined in the characterizing portion of claim 8, which specifies that downlink power is controlled by a method which performs the step of sending downlink transmit power control commands on at least one uplink control channel to support power control for a multiple of downlink carriers, wherein each transmit power control command is assigned a pre-determined code word known by said user equipment and said communication network node and different pre-determined slot formats, known by said user equipment and said communication network node, are used to integrate different number of transmit power control command based on the number of used downlink and uplink carriers.

According to a fifth aspect of embodiments of the present invention this objective is achieved through an arrangement in a user equipment as defined in the characterizing portion of claim 11, which specifies that downlink power is controlled by an arrangement comprising a transmitting unit arranged to send downlink transmit power control commands on at least one uplink control channel to support power control for a multiple of downlink carriers.

According to a sixth aspect of embodiments of the present invention this objective is achieved through an arrangement in a user equipment as defined in the characterizing portion of claim 12, which specifies that downlink power is controlled by an arrangement comprising:
- a transmitting unit arranged to send downlink transmit power control commands on at least one uplink control channel to support power control for a multiple of downlink carriers; and,
- a processing unit arranged to assign each transmit power control command a pre-determined code word known by said user equipment and said communication network node.

According to a seventh aspect of embodiments of the present invention this objective is achieved through an arrangement in a user equipment as defined in the characterizing portion of claim 16, which specifies that downlink power is controlled by an arrangement comprising:
- a transmitting unit arranged to send downlink transmit power control commands on at least one uplink control channel to support power control for a multiple of downlink carriers; and,
- a processing unit arranged to use different pre-determined slot formats, known by said user equipment and said communication network node, to integrate different number of transmit power control command based on the number of used downlink and uplink carriers.

According to an eighth aspect of embodiments of the present invention this objective is achieved through an arrangement in a user equipment as defined in the characterizing portion of claim 18, which specifies that downlink power is controlled by an arrangement comprising:
- a transmitting unit arranged to send downlink transmit power control commands on at least one uplink control channel to support power control for a multiple of downlink carriers; and,
- a processing unit arranged to assign each transmit power control command a pre-determined code word known by said user equipment and said communication network node and to use different pre-determined slot formats, known by said user equipment and said communication network node, to integrate different number of transmit power control command based on the number of used downlink and uplink carriers.

Further embodiments are listed in the dependent claims.

Thanks to the provision of a method and an arrangement, which are sending downlink TPC commands on the uplink in a multi-carrier system, flexibility in trading uplink signalling cost with downlink F-DPCH performance is allowed. Further, by transmitting TPC commands for multiple downlink F-DPCHs on the same UL DPCCH, the required hardware resources in node B to decode the UL DPCCH is reduced compared to the situation in which a separate UL DPCCH is used for each downlink F-DPCH. Additionally, the need for excessive power for the UL DPCCH may be avoided, thus increasing system coverage and capacity.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a better understanding, reference is made to the following drawings and preferred embodiments of the invention. In the drawings, wherein like reference characters denote similar elements throughout the several views.

DETAILED DESCRIPTION

Figure 1:
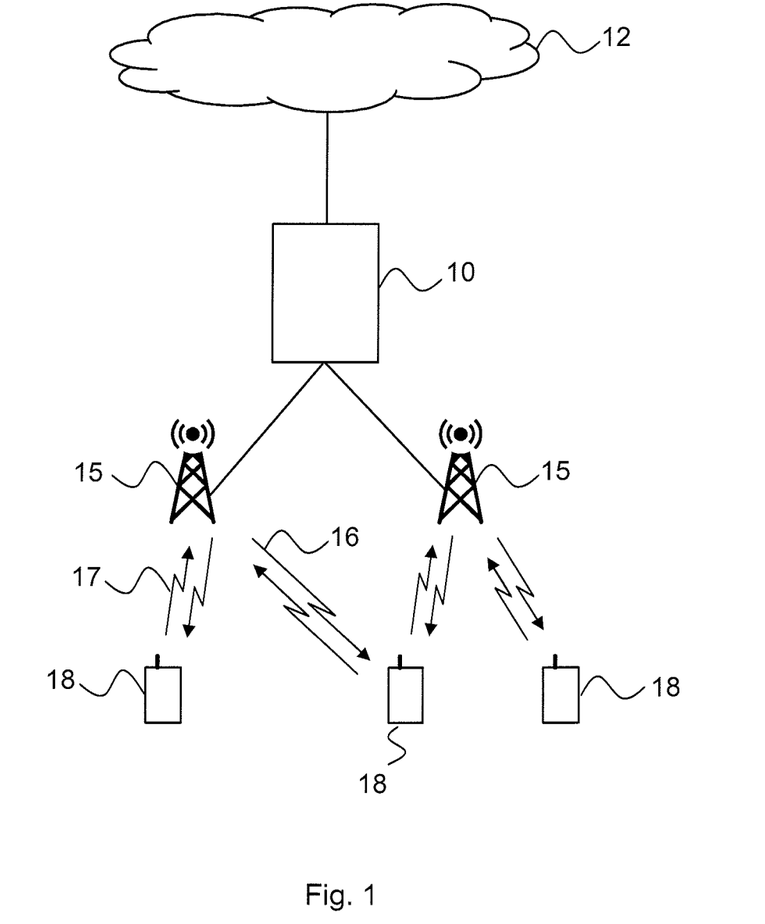
FIG. 1 shows a communication network architecture according to embodiments of the present invention.

FIG. 1 depicts a communication system including a Radio Access Network (RAN), such as the UMTS Terrestrial Radio Access Network (UTRAN) architecture, comprising at least one Radio Base Station (RBS) (eNode B or Node B) 15 (two are shown in FIG. 1) connected to one or more Radio Network Controllers (RNCs) 10. The RAN is connected to a Core Network (CN) 12. The RAN and the CN 12 provide communication and control for a plurality of user equipments (UE) 18 that each uses downlink (DL) channels 16 and uplink (UL) channels 17. For clarity, only one uplink channel is denoted 17 and downlink channel denoted 16. On the downlink channel 16, the RBS 15 transmits to each user equipment 18 at a respective power level. On the uplink channel 17, the user equipments 18 transmit data to the RBS 15 at respective power levels.

According to a preferred embodiment of the present invention, the communication system is herein described as an HSPA communication system. The skilled person, however, realizes that the inventive method and arrangement works very well on other packet-based communications systems as well, such as a Long Term Evolution (LTE) system, WiMax, UTRA TDD, and the like. The user equipments 18 may be mobile stations such as mobile telephones ("cellular" telephones) and laptop computers with mobile termination and thus may be, for example, portable, pocket, hand-held, computer-included, or car-mounted mobile devices which communicate voice and/or data with the RAN.

Embodiments of the invention describe mechanisms and arrangements to convey downlink TPC commands on the uplink in a multi-carrier HSPA system. More specifically, one UL DPCCH is used to support DL power control for multiple carriers, to guarantee as much as possible the UL channel estimation quality, which is typically measured on pilot symbols and to meanwhile also protect DL TPC commands.

The user equipments 18 send downlink TPC commands via uplink control channels to the Node B 15 to control the downlink DPCH transmit power.

According to a first embodiment of the invention different code words are used to indicate different UP/DOWN TPC command combinations. Thus, Each UP/DOWN TPC command combination is assigned a specific code word. Depending on the number of used carriers, different code word length is used. For example, assuming up to 2 DL carriers and 1 UL carrier are to be supported, a 2-bit codeword might be used to indicate 4 UP/DOWN indication combinations. When Node B uses only one carrier for one UE, a 2-bit codeword have more protection for one DL TPC commands convey while less protection is used when using two carriers for transmission.

Thus, the more bits for the code word, the more protection for TPC commands. If more than one UL carrier (e.g. 4 DL, 2 UL) is used, each UL DPCCH may support two DL carriers, meaning one DPCCH may convey DL TPC commands for two DL carriers. As usual, the TPC codeword is time multiplexed with dedicated uplink pilot bits in one UL DPCCH time slot.

Table 1 shows an example of mapping UP/DOWN TPC command combinations to different code words.

TABLE 1

| UP/DOWN indication combination | Code word |
|---|---|
| UP | CW1 |
| DOWN | CW2 |
| UP/UP | CW3 |
| UP/DOWN | CW4 |
| DOWN/UP | CW5 |
| DOWN/DOWN | CW6 |
| UP/UP/UP | CW7 |
| UP/UP/DOWN | CW8 |
| UP/DOWN/UP | CW9 |
| UP/DOWN/DOWN | CW10 |
| DOWN/UP/UP | CW11 |
| DOWN/UP/DOWN | CW12 |
| DOWN/DOWN/UP | CW13 |
| DOWN/DOWN/DOWN | CW14 |
| ... | |

Table 2 shows another example of mapping UP/DOWN indication combinations to different code words.

TABLE 2

| UP/DOWN indication combination | Code word |
|---|---|
| UP | CW1 |
| DOWN | CW2 |
| UP/UP | CW1 |
| UP/DOWN | CW2 |
| DOWN/UP | CW3 |
| DOWN/DOWN | CW4 |
| UP/UP/UP | CW1 |
| UP/UP/DOWN | CW2 |
| UP/DOWN/UP | CW3 |
| UP/DOWN/DOWN | CW4 |
| DOWN/UP/UP | CW5 |
| DOWN/UP/DOWN | CW6 |

TABLE 2-continued

| UP/DOWN indication combination | Code word |
|---|---|
| DOWN/DOWN/UP | CW7 |
| DOWN/DOWN/DOWN | CW8 |
| ... | |

The rules of UP/DOWN TPC commands combination may be pre-determined and are known by both UE and Node B. Since the Node B knows how many carriers it uses, it knows how to interpret the UP/DOWN code words.

Figure 2:
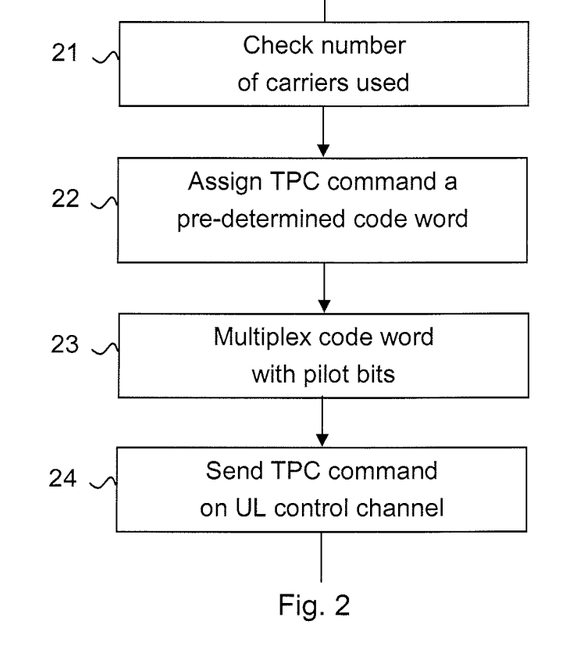
FIG. 2 is a flowchart of a first embodiment of the present invention.

This is illustrated in the flowchart in FIG. 2, in which downlink power in a multi-carrier communication network system is controlled by the steps of:

A processing unit of a user equipment checks a number of carriers used (step 21);

The processing unit also assigns a TPC command a pre-determined code word based on the number of carriers used (step 22);

The processing unit further multiplexes the assigned code word with pilot bits (step 23); and A sending unit of the user equipment sends the TPC command on an uplink control channel (step 24).

According to a second embodiment of the invention different slot formats are used based on the number of carriers utilized. In current 3GPP specification, there are eight slot formats defined for UL DPCCH transmission in both normal mode and compressed mode. Table 3 shows the UL DPCCH fields defined in 3GPP technical specification TS 25.211.

TABLE 3

| Slot Format #i | Channel Bit Rate (kbps) | Channel Symbol Rate (ksps) | SF | Bits/ Frame | Bits/ Slot | $N_{pilot}$ | $N_{TPC}$ | $N_{TFCI}$ | $N_{FBI}$ | Transmitted slots per radio frame |
|---|---|---|---|---|---|---|---|---|---|---|
| 0 | 15 | 15 | 256 | 150 | 10 | 6 | 2 | 2 | 0 | 15 |
| 0A | 15 | 15 | 256 | 150 | 10 | 5 | 2 | 3 | 0 | 10-14 |
| 0B | 15 | 15 | 256 | 150 | 10 | 4 | 2 | 4 | 0 | 8-9 |
| 1 | 15 | 15 | 256 | 150 | 10 | 8 | 2 | 0 | 0 | 8-15 |
| 2 | 15 | 15 | 256 | 150 | 10 | 5 | 2 | 2 | 1 | 15 |
| 2A | 15 | 15 | 256 | 150 | 10 | 4 | 2 | 3 | 1 | 10-14 |
| 2B | 15 | 15 | 256 | 150 | 10 | 3 | 2 | 4 | 1 | 8-9 |
| 3 | 15 | 15 | 256 | 150 | 10 | 7 | 2 | 0 | 1 | 8-15 |

In a multi-carrier HSPA system, the above slot formats may be used to integrate different number of TPC commands and also indicate different number of carriers the Node B uses.

For example, if one DL carrier is used, UE may use Slot Format 1 (for legacy UE as well); if two DL carriers are used, UE will use Slot Format 0, where 6 pilot bits are kept and a 2-bit TFCI field may be used for conveying TPC commands; if three DL carriers are used, UE will use Slot Format 0B or 2A.

Alternatively, some completely new slot formats for UL DPCCH may be defined.

In any case, either using the existing slot formats or using a new defined slot formats, UE dynamically selects the slot format depending on the number of carriers used as UE has the information on how many downlink carriers are used by the Node B. The UE may at most be configured to use the minimum of the maximum number of downlink carriers supported by the UE and the Node B. The UE may also be configured to use the maximum number of downlink carriers, which is lower than its maximum capability. The configuration is done by the network via higher layer signalling and is modified on run time by the network depending upon network implementation algorithm.

The rule of slot format selection may be pre-determined and are known by both UE and Node B.

Figure 3:
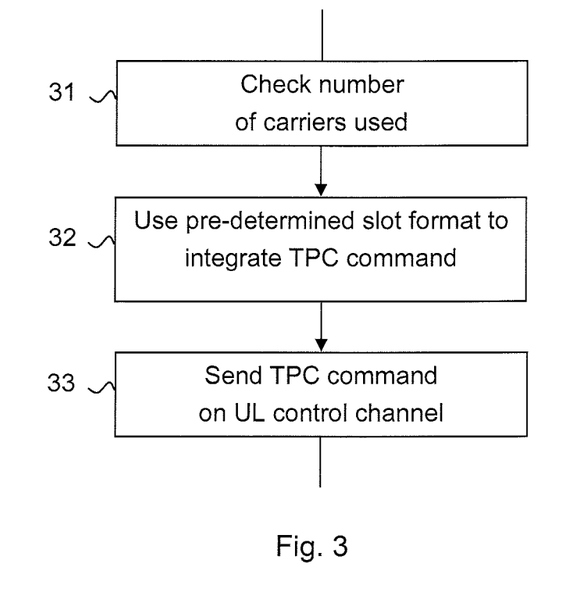
FIG. 3 is a flowchart of a second embodiment of the present invention.

This is illustrated in the flowchart in FIG. 3, in which downlink power in a multi-carrier communication network system is controlled by the steps of:

A processing unit of a user equipment checks a number of carriers used (step 31);

The processing unit also uses a pre-determined slot format to integrate the TPC commands based on the number of carriers used (step 32); and, A sending unit of the user equipment sends the TPC command on an uplink control channel (step 33).

According to a third embodiment of the invention, the first and second embodiments are used together. For example, using Slot Format 0 has a 4-bit room ($N_{TPC}=2$, $N_{TFCI}=2$) for conveying TPC commands. These 4 bits may generate a 4-bit code word, which then is defined according to the first embodiment described above.

Figure 4:
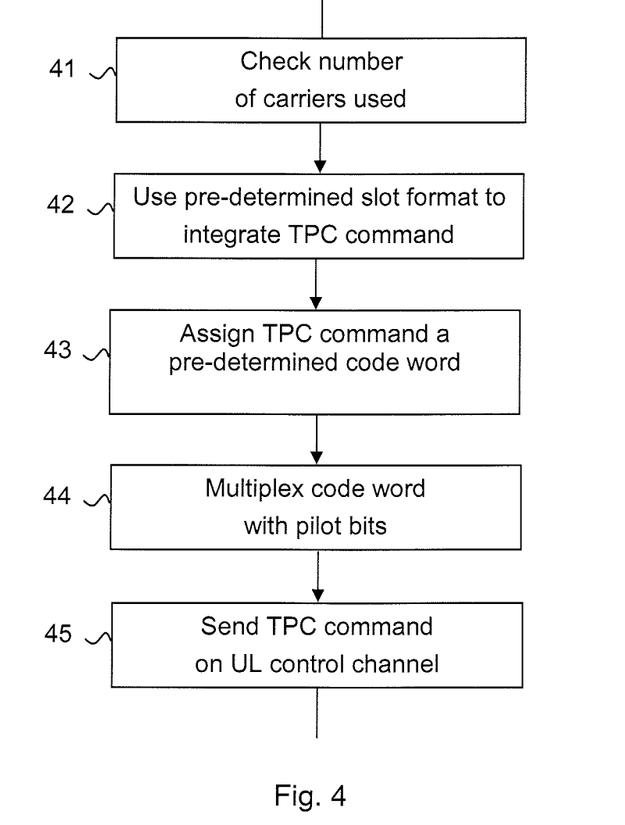
FIG. 4 is a flowchart of a third embodiment of the present invention.

This is illustrated in the flowchart in FIG. 4, in which downlink power in a multi-carrier communication network system is controlled by the steps of:

A processing unit of a user equipment checks a number of carriers used (step 41);

The processing unit also uses a pre-determined slot format to integrate the TPC commands based on the number of carriers used (step 42); and, The processing unit also assigns a TPC command a pre-determined code word based on the number of carriers used (step 43);

The processing unit further multiplexes the assigned code word with pilot bits (step 44); and A sending unit of the user equipment sends the TPC command on an uplink control channel (step 45).

According to embodiments of the present invention, the procedure in a user equipment of controlling downlink power in a multi-carrier communication network system comprising communication network nodes communicating with a plurality of user equipments on uplink and downlink carriers over a radio interface is characterized by the step of sending at least downlink transmit power control commands on at least one uplink control channel to support power control for a multiple of downlink carriers.

According to some embodiments, each transmit power control command is assigned a pre-determined code word known by said user equipment and said communication network node.

According to some embodiments, a length of said code word is dependent on the number of used downlink and uplink carriers.

According to some embodiments, when more than one uplink carrier is used for sending said downlink transmit power control commands, each one of said uplink carriers support at least two downlink carriers.

According to some embodiments, said code word is multiplexed with pilot bits in said at least one uplink control channel.

According to some embodiments, different pre-determined slot formats to integrate different number of transmit power control command are used based on the number of used downlink and uplink carriers, whereby said pre-determined slot formats are known by said user equipment and said communication network node.

According to some embodiments, said slot format is dynamically selected depending on said number of used downlink and uplink carriers.

According to some embodiments, said multi-carrier communication network system is based on CDMA, HSDPA, HSUPA or HSPA technology.

According to some embodiments, each transmit power control command is assigned a pre-determined code word known by said user equipment and said communication network node and different pre-determined slot formats are used to integrate different number of transmit power control command based on the number of used downlink and uplink carriers, whereby said pre-determined slot formats are known by said user equipment and said communication network node.

Figure 5:
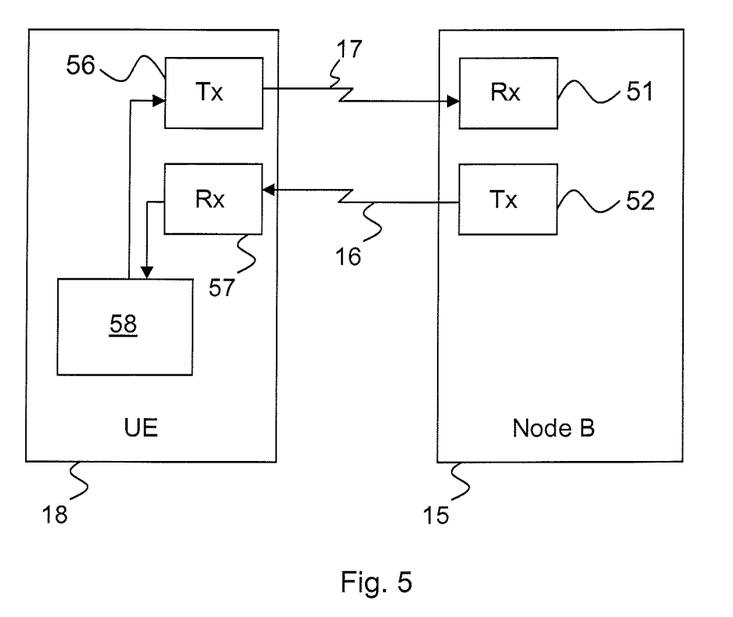
FIG. 5 shows a block diagram of an inventive user equipment communicating with a communication network node.

FIG. 5 is a block diagram showing a user equipment 18 and a communication network node 15, such as Node B, of controlling downlink power in a multi-carrier communication network system comprising communication network nodes communicating with a plurality of user equipments on uplink and downlink carriers over a radio interface.

The Node B 15 comprises a transmitting unit 52 including a radio transmitter. The Node B further comprises a receiving unit 51 including a receiver. The transmitter 52 is transmitting data to a receiver 57 of the user equipment 18 over a radio interface on the downlink channel 16. The receiver 51 is receiving data from the user equipment 18 on the uplink channel 17.

The user equipment 18 comprises a transmitting unit 56 including a radio transmitter. The radio transmitter 56 is arranged to transmit data packets to the receiver 51 of the Node B 15 over the radio interface on the uplink channel 17. The UE 18 further comprises a receiving unit 57 including a receiver. The receiver 57 is arranged to receive data packets transmitted from the transmitter 52 of the Node B 15 on the downlink channel 16. The transmitting unit 56 is further arranged to send downlink transmit power control commands on at least one uplink control channel to support power control for a multiple of downlink carriers.

According to some embodiments, the user equipment further comprises a processing unit 58 arranged to assign each transmit power control command a pre-determined code word known by said user equipment and said communication network node.

According to some embodiments, said processing unit 58 is arranged to give a length of said code word dependent on the number of used downlink and uplink carriers.

According to some embodiments, when said transmitting unit 56 is arranged to use more than one uplink carrier for sending said downlink transmit power control commands, each one of said uplink carriers is arranged to support at least two downlink carriers.

According to some embodiments, said processing unit 58 is further arranged to multiplex said code word with pilot bits in said at least one uplink control channel.

According to some embodiments, the processing unit 58 is arranged to use different pre-determined slot formats to integrate different number of transmit power control command based on the number of used downlink and uplink carriers, whereby said pre-determined slot formats are known by said user equipment and said communication network node.

According to some embodiments, said processing unit 58 further is arranged to dynamically select said slot format depending on said number of used downlink and uplink carriers.

According to some embodiments, said processing unit 58 is arranged to assign each transmit power control command a pre-determined code word known by said user equipment and said communication network node and to use different pre-determined slot formats to integrate different number of transmit power control command based on the number of used downlink and uplink carriers, whereby said pre-determined slot formats are known by said user equipment and said communication network node.

According to some embodiments, said multi-carrier communication network system is based on CDMA, HSDPA, HSUPA or HSPA technology.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a user equipment of controlling downlink power in a multi-carrier communication network system comprising communication network nodes communicating with a plurality of user equipments on uplink carriers and downlink carriers over a radio interface, the method comprising:
   sending downlink transmit power control commands on at least one uplink control channel, the downlink transmit power control commands comprising information for individual power control for a multiple of downlink carriers; and
   assigning each transmit power control command a predetermined code word known by said user equipment and said communication network node.

2. A method according to claim 1, wherein a length of said code word is dependent on the number of used downlink carriers and uplink carriers.

3. A method according to claim 1, wherein when more than one uplink carrier is used to send said downlink transmit power control commands, each one of said uplink carriers supporting at least two downlink carriers.

4. A method according to claim 1, further comprising:
   multiplexing said code word with pilot bits in said at least one uplink control channel.

5. A method in a user equipment of controlling downlink power in a multi-carrier communication network system comprising communication network nodes communicating with a plurality of user equipments on uplink carriers and downlink carriers over a radio interface, the method comprising:
   sending downlink transmit power control commands on at least one uplink control channel, the downlink transmit power control commands comprising information for individual power control for a multiple of downlink carriers; and
   using different pre-determined slot formats to integrate different number of transmit power control command based on the number of used downlink carriers and uplink carriers, whereby said pre-determined slot formats are known by said user equipment and said communication network node.

6. A method according to claim 5, further comprising:
   dynamically selecting said slot format depending on said number of used downlink carriers and uplink carriers.

7. A method in a user equipment of controlling downlink power in a multi-carrier communication network system comprising communication network nodes communicating with a plurality of user equipments on uplink carriers and downlink carriers over a radio interface, the method comprising:
   sending downlink transmit power control commands on at least one uplink control channel, the downlink transmit power control commands comprising information for individual power control for a multiple of downlink carriers;
   assigning each transmit power control command a pre-determined code word known by said user equipment and said communication network node; and
   using different pre-determined slot formats to integrate different number of transmit power control command based on the number of used downlink carriers and uplink carriers, whereby said pre-determined slot formats are known by said user equipment and said communication network node.

8. A method according to claim 1, wherein the multi-carrier communication network system is based on CDMA technology.

9. A method according to claim 1, wherein the multi-carrier communication network system is HSDPA or HSUPA or HSPA.

10. An arrangement in a user equipment of controlling downlink power in a multi-carrier communication network system comprising communication network nodes communicating with a plurality of user equipments on uplink carriers and downlink carriers over a radio interface, the arrangement comprising:
    a transmitting unit arranged to send downlink transmit power control commands on at least one uplink control channel, the downlink transmit power control commands comprising information for individual power control for a multiple of downlink carriers; and
    a processing unit arranged to assign each transmit power control command a pre-determined code word known by said user equipment and said communication network node.

11. An arrangement according to claim 10, said processing unit being further arranged to give a length of said code word dependent on the number of used downlink carriers and uplink carriers.

12. An arrangement according to claim 10, wherein when said transmitting unit is arranged to use more than one uplink carrier to send said downlink transmit power control commands, each one of said uplink carriers is arranged to support two downlink carriers.

13. An arrangement according to claim 10, wherein said processing unit is further arranged to multiplex said code word with pilot bits in said at least one uplink control channel.

14. An arrangement in a user equipment of controlling downlink power in a multi-carrier communication network system comprising communication network nodes communicating with a plurality of user equipments on uplink carriers and downlink carriers over a radio interface, the arrangement comprising:
- a transmitting unit arranged to send downlink transmit power control commands on at least one uplink control channel, the downlink transmit power control commands comprising information for individual power control for a multiple of downlink carriers; and
- a processing unit arranged to use different pre-determined slot formats to integrate different number of transmit power control command based on the number of used downlink carriers and uplink carriers, whereby said pre-determined slot formats are known by said user equipment and said communication network node.

15. An arrangement according to claim 14, said processing unit being further arranged to dynamically select said slot format depending on said number of used downlink carriers and uplink carriers.

16. An arrangement in a user equipment of controlling downlink power in a multi-carrier communication network system comprising communication network nodes communicating with a plurality of user equipments on uplink carriers and downlink carriers over a radio interface, the arrangement comprising:
- a transmitting unit arranged to send downlink transmit power control commands on at least one uplink control channel, the downlink transmit power control commands comprising information for individual power control for a multiple of downlink carriers; and
- a processing unit arranged to assign each transmit power control command a pre-determined code word known by said user equipment and said communication network node, and use different pre-determined slot formats to integrate different number of transmit power control command based on the number of used downlink carriers and uplink carriers, whereby said pre-determined slot formats are known by said user equipment and said communication network node.

17. An arrangement according to claim 10, wherein the multi-carrier communication network system is based on CDMA technology.

18. An arrangement according to claim 10, wherein the multi-carrier communication network system is HSDPA or HSUPA or HSPA.

* * * * *